United States Patent [19]

Taylor

[11] Patent Number: 5,729,920
[45] Date of Patent: Mar. 24, 1998

[54] ATTACHMENT FOR A GRAB IMPLEMENT

[76] Inventor: William Taylor, 55 Letterloan Road, Coleraine, Northern Ireland, BT51 4PP

[21] Appl. No.: 532,762

[22] PCT Filed: Apr. 14, 1994

[86] PCT No.: PCT/EP94/01179

§ 371 Date: Oct. 20, 1995

§ 102(e) Date: Oct. 20, 1995

[87] PCT Pub. No.: WO94/23559

PCT Pub. Date: Oct. 27, 1994

[30] Foreign Application Priority Data

Apr. 15, 1993 [GB] United Kingdom ............ 9307753

[51] Int. Cl.⁶ .................................................. E02F 3/96
[52] U.S. Cl. .................. 37/406; 37/409; 414/725; 414/740
[58] Field of Search ................ 37/406, 407, 409, 37/416, 448, 901, 903; 414/704, 725, 726, 739, 740

[56] References Cited

U.S. PATENT DOCUMENTS

| | | | |
|---|---|---|---|
| 2,326,338 | 8/1943 | Drott et al. | 414/740 X |
| 2,387,656 | 10/1945 | Gledhill | 414/912 X |
| 2,402,299 | 6/1946 | Schield | 37/901 X |
| 2,418,251 | 4/1947 | Drott | 414/739 X |
| 2,786,591 | 3/1957 | Neumeister | 414/704 X |
| 2,848,125 | 8/1958 | Irvine | 414/740 X |
| 2,979,215 | 4/1961 | Brisson | 37/406 X |
| 3,048,292 | 8/1962 | Kohorst et al. | 37/901 X |
| 3,057,496 | 10/1962 | Garske | 414/704 |
| 3,079,021 | 2/1963 | Kohorst et al. | 37/901 X |
| 3,163,304 | 12/1964 | Kohorst et al. | 414/704 X |
| 3,252,606 | 5/1966 | Pryor | 414/704 |
| 3,348,715 | 10/1967 | Kretz | 414/704 |
| 3,433,377 | 3/1969 | Campbell | 414/704 |
| 3,455,477 | 7/1969 | Blair | 414/704 |
| 3,461,968 | 8/1969 | Longely | 37/406 X |
| 3,559,314 | 2/1971 | Funk | 37/406 |
| 3,700,131 | 10/1972 | Westendorf | 414/704 |
| 3,750,816 | 8/1973 | Becker | 414/704 |
| 3,904,052 | 9/1975 | Nordstrom | 414/725 |
| 4,110,921 | 9/1978 | Poker, Jr. | |
| 4,297,073 | 10/1981 | Schmid et al. | 414/704 |
| 4,565,485 | 1/1986 | Wilman | 414/726 X |
| 4,890,400 | 1/1990 | Long | |
| 5,077,918 | 1/1992 | Garman | 37/903 X |

FOREIGN PATENT DOCUMENTS

| | | |
|---|---|---|
| 1 536 937 | 12/1978 | European Pat. Off. |
| 1426627 | 12/1965 | France ............ 37/409 |
| 2 263 961 | 10/1975 | France |
| 2 492 621 | 4/1982 | France |
| 3219024 | 11/1983 | Germany |
| 3318338 | 11/1983 | Germany |
| 39 15 414 | 11/1990 | Germany |
| 92 16 712 | 4/1993 | Germany |
| 955047 | 4/1964 | United Kingdom |
| 1061683 | 3/1967 | United Kingdom |
| 2 191 992 | 12/1987 | United Kingdom |
| 2191992 | 12/1987 | United Kingdom |
| 2226299 | 6/1990 | United Kingdom |
| 2244468 | 12/1991 | United Kingdom |

*Primary Examiner*—Terry Lee Melius
*Assistant Examiner*—Thomas A. Beach
*Attorney, Agent, or Firm*—Oliff & Berridge, PLC

[57] ABSTRACT

A grab implement comprising a fixed part (31) and a movable part (30) pivotally coupled thereto to form a grab, the fixed part (31) having a continuous rear wall member (2) and a continuous floor member (4) projecting forwardly therefrom, the floor member (4) having a cutting edge along the leading edge thereof.

37 Claims, 3 Drawing Sheets

ATTACHMENT FOR A GRAB IMPLEMENT

FIELD OF THE INVENTION

The present invention relates to a grab implement for use in cutting blocks of solid material, and more particularly to a grab implement for attachment to a powered vehicle, for example an agricultural vehicle such as a tractor.

BACKGROUND TO THE INVENTION

In agricultural equipment, a known type of silage grab is attached to the powered front or rear loader of a tractor, the attachment comprising a base constituted by a plurality of spaced apart tines with a movable jaw operable about a horizontal pivot axis and including a further set of tines which are closed at right angles to the base tines after the base tines have been driven into a silage clamp, to tear out a load of silage. An example of such a silage grab is described in British Patent 1536937, the entire disclosure of which is incorporated herein by reference. Silage grabs using tines are apt to leave a ragged surface on the sides and face of the silage clamp after a load has been removed, and this surface can support secondary fermentation and hence spoilage of the clamp.

UK Patent Application No. 2191992, the entire disclosure of which is incorporated herein by reference, discloses a silage grab which comprises a fixed part having a back wall and a plurality of tines projecting forwardly from the lower part of the back wall with said tines being drivable into a silage clamp, a moving part of the grab being pivotally connected to the fixed part about a generally horizontally extending rotational axis and having a front wall with a cutting edge along the lower part thereof, a drive means being connected between the fixed part and moving part and arranged to forcibly drive the cutting edge of the moving part downwardly about said axis to be adjacent the ends of the tines, the parts constituting the front wall lying along an arc about the rotation axis, the arc being that described by the cutting edge during movement.

The downward action of the cutting edge in the grab of GB 2191992 give a smoother vertical side to the cut silage, but can cause tearing of the bottom of the grabbed silage load if insufficient tines are present. In addition, the grab suffers from the drawback that because the floor of the grab is formed from spaced-apart tines, the grab cannot be used to transport granular or particulate material, such as barley or feed concentrate. This has the associated disadvantage that the user of the silage grab must carry out the time consuming task of changing the grab implement for a shovel when the implement is to be used for transporting other feed materials.

SUMMARY OF THE INVENTION

The present invention provides a grab implement having a continuous floor member provided with a cutting edge which is suitable for cutting and transporting silage and transporting other animal feed materials.

In a first aspect the present invention provides a grab implement for cutting silage, the grab implement comprising a fixed part and a movable part pivotally coupled thereto to form a grab, the fixed part having a continuous rear wall member and a continuous floor member projecting forwardly, the floor member having a cutting edge along the leading edge thereof.

It can be seen that the present invention obviates the need for tines providing a cutting edge along the leading edge of the fixed part of the grab, and by providing the fixed part with a continuous floor member enables the grab implement to be used as a scoop or shovel for conveying granular or particulate loads.

By "continuous" in this specification is meant that the member is substantially able to hold back and prevent the passage of granular or particulate agricultural loads, therethrough, but the possibility is not excluded that the member may have a number of holes or slots whose size is insufficient to allow a substantial quantity of the load to escape.

In another aspect, the invention provides a fixed part for a grab implement for cutting silage, the grab implement comprising a fixed part and a movable part pivotally coupled thereto to form a grab, the fixed part comprising a continuous rear wall member and a continuous floor member projecting forwardly therefrom, the floor member having a cutting edge along the leading edge thereof.

Preferably the fixed part comprises a generally bucket-shaped member comprising a plurality of gusset members extruding between the rear wall member and the floor member. Preferably gusset members form continuous side members for the fixed part. Where the grab implement is of relatively narrow width, for example, less than about 0.6 meters, the side members may be the only gusset members present. Where the width of the grab implement is greater than about 0.8 meters, further strengthening gusset members are preferably provided, spaced across the width, preferably at intervals of from about 0.4 to 0.6 meters apart.

Preferably at least the side members and preferably any other gusset members present are provided with cutting edges to assist the cutting action of the cutting edge on the floor member.

Preferably the cutting edge of the floor member is substantially straight and extends across the entire width of the floor member. In other embodiments the cutting edge may be V-shaped, or V-shaped sections arranged side-by-side. The cutting edge or edges are preferably formed from high tensile material, for example, high tensile steel.

In order to protect the cutting edge on the floor member from damage by ground contact it is preferably slightly raised, and this can conveniently be done by providing a supporting means beneath the floor member to raise the floor member slightly off the ground. The supporting means can comprise, for example, a supporting wear strip arranged around the sides of the underside of the floor member. The supporting wear strip may have a height of, for example, from 10 mms to 40 mms.

As a further protection for the cutting edge the floor member, edge protectors are preferably provided which extend forwardly of the cutting edge. These edge protectors may be pointed or bullet-shaped and extend up to 25 mms or more in front of the cutting edge. The edge protectors can help to prevent damage to the cutting edge due, for example, to contact with vertical walls against which silage or granular material or other animal feed may be stacked. Two or more such edge protectors may be provided, for example, at each end of the cutting edge, and, if necessary, at points intermediate the ends.

In a preferred embodiment, the fixed part further comprises ejector means for ejecting solid material carried by the grab attachment therefrom.

The ejector means may comprise at least one elongate member attached at one end thereof to the rear member and the other end of which protrudes through a narrow elongate slot in the floor member, wherein the end of the or each elongate member protruding through said respective slot is adapted to move relative to the rear member.

The or each elongate member is preferably pivotally attached to the rear member. Two or more such elongate members may be provided, which can be joined by a horizontal bar to form an ejector gate operated by ground contact.

Alternatively, the ejector means may be a hydraulically operated ejector gate.

The fixed part is pivotally coupled to a movable part to form a grab implement. Preferably the movable part is pivotally connected to the fixed part about a generally horizontally extending rotational axis. The movable part of the grab implement preferably comprises a front wall member with a cutting edge along the lower front edge thereof. A suitable grab implement movable part is described in GB 2191992.

Preferably the movable part is provided with continuous side members, which are preferably provided with cutting edges on their lower edges.

Preferably the grab implement is provided with drive means, which can, for example, be hydraulically operated, and which is arranged to drive the cutting edge of the movable part in an arc towards the cutting edge on the floor member.

In order that the invention can be better understood, preferred embodiments thereof will now be described, by way of example only, with reference to the accompanying Drawings, in which.

Figure 1:
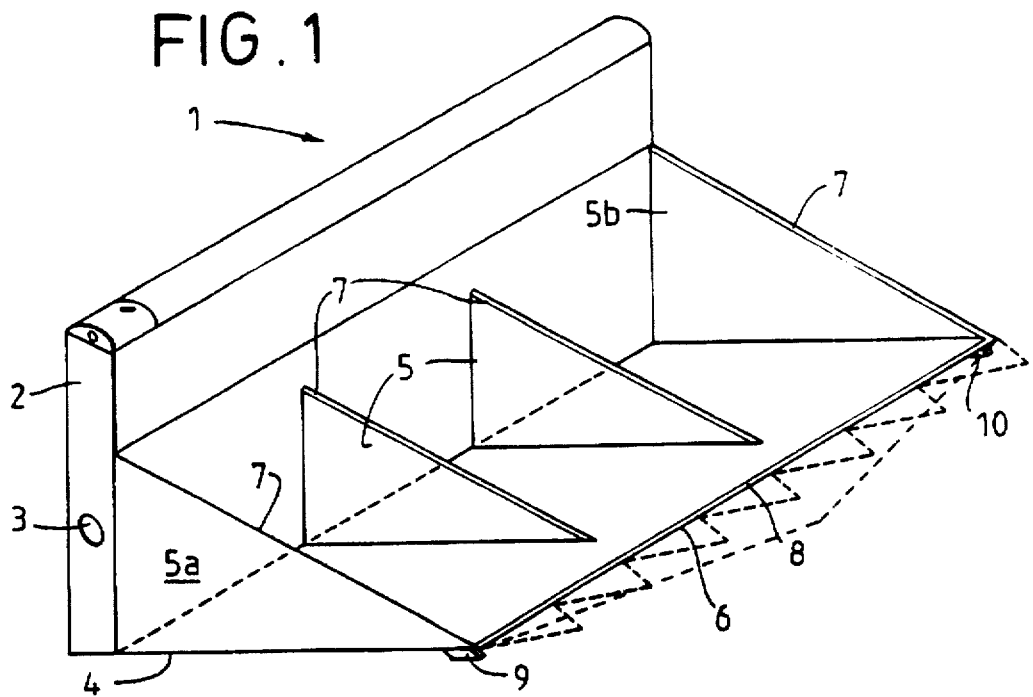
FIG. 1 shows a perspective view of a first embodiment of a bucket base for a grab implement according to the invention.

Referring in detail to FIG. 1, which is not drawn to scale, there is shown a fixed part 1 for attachment to an agricultural implement (not shown) such as a tractor front loader or farm shovel. The fixed part 1 can be attached to either the front or the rear of a tractor.

The fixed part 1 comprises a continuous rear plate 2 having a pivot attachment 3 for accommodating a movable part, which will be described below and which has been omitted from FIG. 1 for reasons of clarity. A floor plate 4 of mild steel or a high tensile material such as high tensile steel is attached by any suitable means, such as welding, to the rear plate 2 and generally at right angles thereto, and a plurality of generally right-angled gusset plates 5 (four are shown in FIG. 1) are attached to the rear plate 2 and floor plate 4 such that two of the gusset plates 5a, 5b form the side walls of the fixed part 1. The two gusset plates 5 between the sides of the attachment (the intermediate gusset plates) are slightly shorter in base length than those forming the sides of the fixed part 1 so that there is a space between the intermediate gusset plates 5 and the front edge 6 of the floor plate 4 of the order of 25 mm. The intermediate gusset plates 5 are also slightly shorter in height than those forming the sides of the fixed part 1 so that the upper edges of the intermediate gusset plates 5 meet the rear plate 2 at points lower than those at which the upper edges of the side plates 5a, 5b meet the rear plate 2.

Knife edges 7, generally 10 mm in thickness and formed from high tensile steel are either attached to or formed in the sloping edge of each gusset plate 5 and the front edge 6 of the floor plate 4 is also provided with a knife edge 8. The knife edge 8 attached to the front edge 6 of the floor plate 4 can be either straight, a single V-shaped member, a plurality of V-shaped members, or any other suitable shape, as will be described hereinafter.

The knife edge 7 is protected by edge protectors 9, 10 each of which is in the form of bullet- or spear-shaped projections of high tensile steel positioned so as to protrude from the front of each knife edge 7 and the sides of the fixed part 1.

Figure 2:
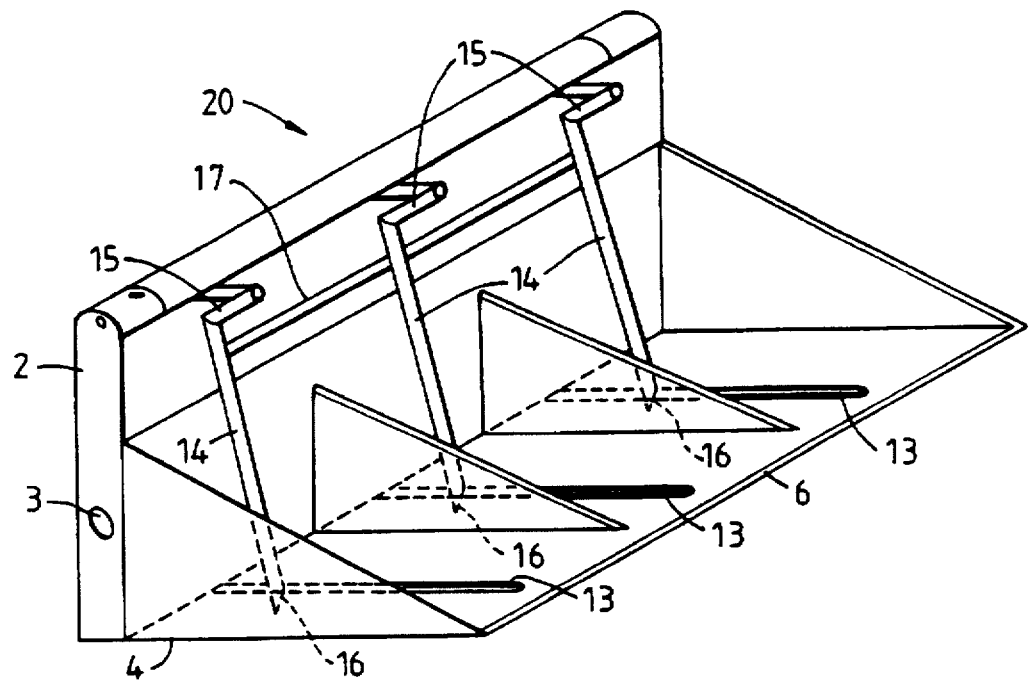
FIG. 2 shows a perspective view of a second embodiment of a bucket base for a grab implement according to the invention showing a ground-operated ejector gate.

FIG. 2, in which parts common to the embodiment of FIG. 1 are designated by like reference numerals, shows a fixed part 20 similar to that of FIG. 1 but having three elongate slots 13 extending through the floor plate 4 from the rear plate 2 towards the front edge 6 of the floor plate 4. It will be appreciated that the number of slots 13 will depend upon the width of the fixed part 1. For example, one, two or more than three slots 13 could be used. An ejector gate comprises three elongate leg members 14, each of which has an upper end 15 hinged to the rear plate 2 and a lower end 16 which protrudes through the respective slot 13, when the leg member 14 is in its lowered position, so that the lower ends 16 can engage the ground when the attachment 1 rests on the ground. The leg members 14 are joined together to form a gate by means of a transversely extending rigid bar 17.

Figure 3:
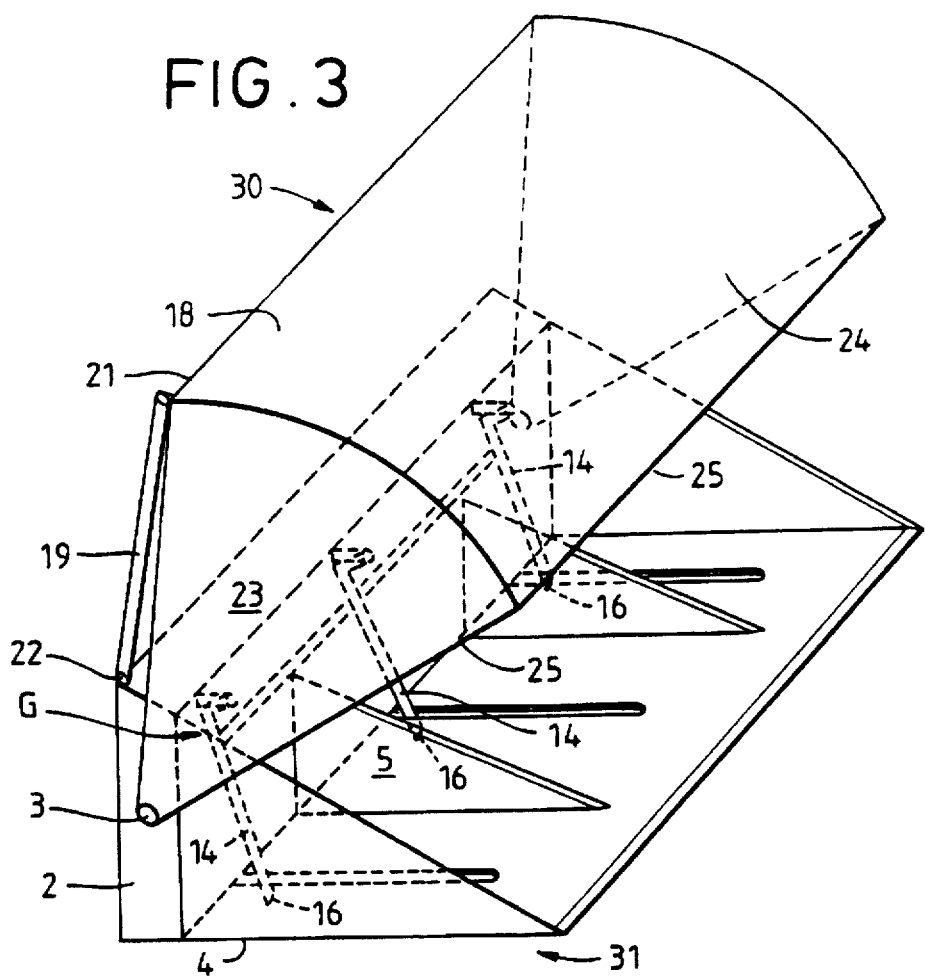
FIG. 3 shows a perspective view of an assembled grab implement according to the invention.

FIG. 3 shows a grab implement 30 incorporating the features of the embodiments of FIGS. 1 and 2, and parts common to those embodiments are designated by like reference numerals. The grab implement 30 further includes a movable part 18 pivotally attached to the pivot attachment 3 provided at both sides of the rear plate 2 and is movable relative to the floor plate 4 by means of two hydraulic rams 19, each of which connects the upper edge 21 of the movable part 18 to the upper edge 22 of the rear plate 2.

The cover member 18 also comprises two side walls 23 and a curved front wall 24, each of which is provided at its lower edge with a knife edge 25. As is the case with the knife edges provided on the fixed part 1, the knife edges 25 provided on the cover member 18, may be serrated.

Figure 4:
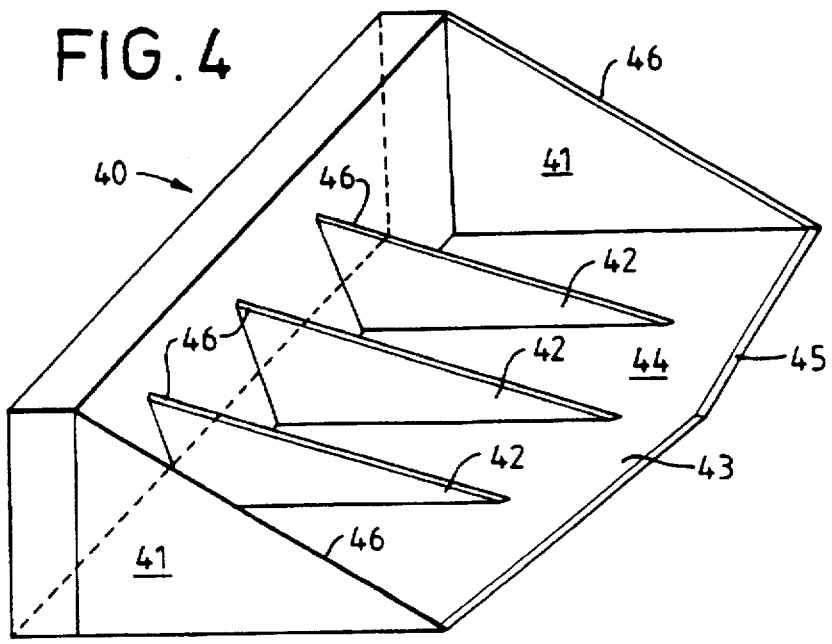
FIG. 4 shows a perspective view of a third embodiment of a bucket base for a grab implement according to the invention.

Referring now to FIG. 4, there is shown a fixed part 40 for a grab implement, which is of welded construction and is provided with side members 41 and three gussets 42. The leading edge 43 of the floor plate 44 is V-shaped and provided with a knife edge 45. The side members and gussets also have knife members 46 on their upper edges.

Figure 5:
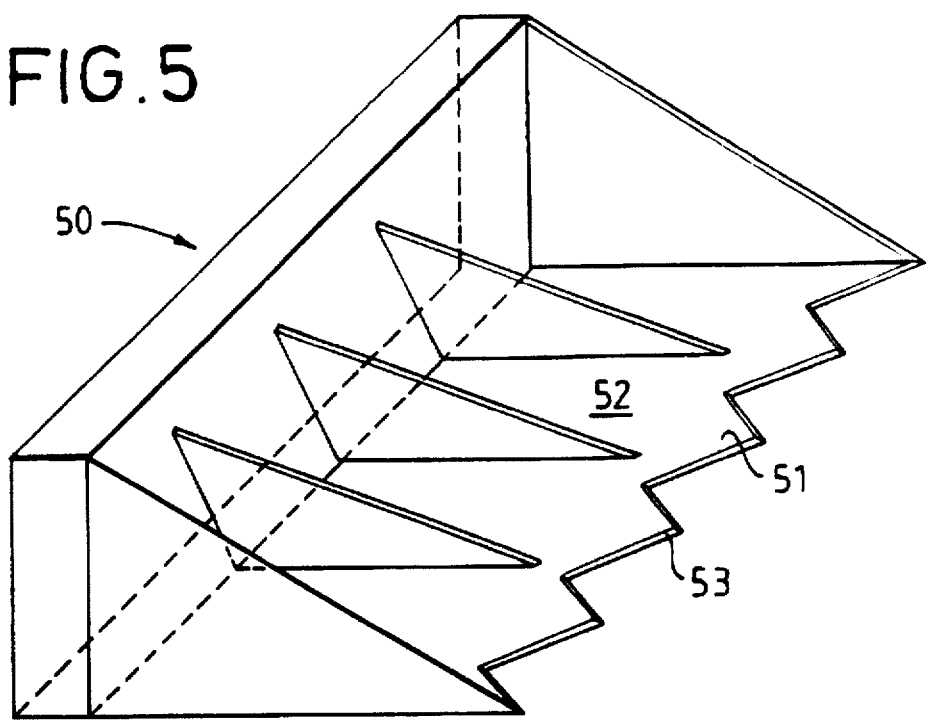
FIG. 5 shows a perspective view of a fourth embodiment of a bucket base for a grab implement according to the invention.

FIG. 5 shows a fixed part 50 for a grab implement similar to that of FIG. 4, except that the leading edge 51 of the floor plate 52 is serrated and provided with a serrated knife member 53.

Figure 6:
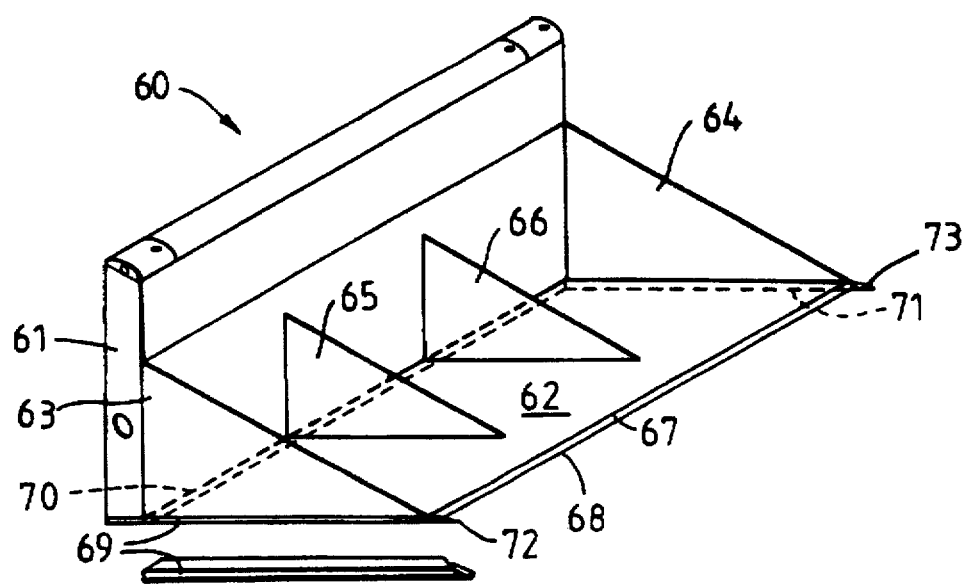
FIG. 6 shows a perspective view of a fifth embodiment of a bucket base for a grab implement according to the invention.

Finally, FIG. 6 shows a fixed part 60 for a grab implement which is provided with a raised cutting edge and cutting edge protectors.

The fixed part 60 comprises a continuous rear wall plate 61 and an 8 mm thick mild steel floor plate 62 welded at right angles thereto. Side members 63, 64 and gussets 65, 66 are welded to the rear plate and the floor plate respectively.

The gussets 65, 66 have a leading angle of generally 30° and extend to within 25 mm of the leading edge 67 of the floor plate 62. Welded to the leading edge 67 is a 60 mm wide×10 mm thick high tensile steel knife edge 68 with a front sloping edge forming a knife blade of 25 mm. The side members and gussets are also provided with cutting knife edges on their upper edges.

The side edges and rear edge of the underside of the floor plate 62 are framed by 60 mm wide×15 mm thick wear bars 69, 70, 71 respectively of high tensile steel which are screwed or welded thereto. The side wear bars 69, 71 are extended forwardly of the knife edge 68 and have tapered extensions 72, 73 acting as edge protectors.

The operation of the embodiments of the invention will now be described with particular reference to FIG. 3, although it will be appreciated that the embodiments of FIGS. 1, 2, 4, 5 and 6 operate in a similar manner. When a load of silage is to be cut from a silage clamp, a tractor or other suitable vehicle (not shown) carrying the grab implement 30 is driven towards the silage until the knife edge 8 provided on the floor plate 4 and the knife edges 7 on the side members 5a, 5b and gusset plates 5 penetrate into the silage. This step of the operation is carried out with the movable part 18 in its raised position. In this case, when the fixed part 31 has penetrated into the silage to a sufficient extent, the movable part 18 is lowered by the hydraulic rams 19 and the knife edges 25 arranged on the lower edges of the cover member 18 sever a block of silage of the desired size from the larger block. The vehicle carrying the attachment 1 is then reversed and driven away from the clamp while carrying the load of silage inside.

When it is desired to eject the load of silage from the grab implement 30, the grab implement 30 is lowered until the lower ends 16 of the leg members 14 of the ejector gate engage the ground. If the vehicle is then reversed, the lower ends 16 of the leg members 14 move towards the front edge 6 of the floor plate 4, thus pushing the load of silage towards the front edge 6. The lower ends 16 remain in contact with the ground sufficiently long for part of the load of silage to protrude beyond the front edge 6 of the floor plate 4 and itself engage the ground. As the vehicle is then reversed further, the load of silage remains in contact with the ground and is completely removed from the grab implement 30. It will be appreciated that the silage or other material carried by the grab implement 30 can also be tipped out of the fixed part 1, as well as being removed by the ejector gate.

Whilst the invention has been described in relation to the cutting of silage in agriculture it will be appreciated that many other uses are possible.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract and drawings), and/or all of the steps or any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

I claim:

1. A silage grab implement, the grab implement comprising a fixed part and a movable part pivotally coupled thereto to form a grab, the fixed part having a continuous rear wall member and a continuous flat floor member projecting forwardly therefrom with intermediate and side gusset members extending between the rear wall member and the floor member, the floor member having an integral cutting knife edge along a leading edge thereof, the knife edge having a sharpness and the floor member having a thickness such that the knife edge and floor member will cut through silage leaving a flat, substantially untorn surface, the gusset members preventing the floor member from bending and deforming when cutting through silage.

2. A silage grab implement according to claim 1, in which the fixed part comprises a generally bucket shaped member.

3. A silage grab implement according to claim 1, in which strengthening gusset members are spaced across the width of the fixed part at intervals of from substantially 0.4 meters to substantially 0.6 meters apart.

4. A silage grab implement according to claim 1, in which the side members and any other gusset members are provided with cutting edges on their upper edges.

5. A silage grab implement according to claim 1, in which the cutting knife edge on the floor member is substantially straight.

6. A silage grab implement according to claim 1, in which the cutting knife edge on the floor member is V-shaped.

7. A silage grab implement according to claim 1, in which the cutting knife edge on the floor member is serrated.

8. A silage grab implement according to claim 1, in which supporting means is provided beneath the floor to raise the cutting knife edge slightly above the ground.

9. A silage grab implement according to claim 8, in which the supporting means comprises a wear strip arranged around the side edges and rear edge of the underside of the floor member.

10. A silage grab implement according to claim 8, in which the supporting means has a height of from substantially 10 mms to substantially 40 mms.

11. A silage grab implement according to claim 1, in which the cutting knife edge along the leading edge of the floor member is provided with edge protectors which extend forwardly of the cutting knife edge.

12. A silage grab implement according to claim 11, in which the edge protectors are provided at each end of the cutting edge.

13. A silage grab implement according to claim 1, in which the fixed part is provided with ejector means for ejecting solid material from the grab attachment.

14. A silage grab attachment according to claim 13, in which the ejector means comprises an ejector gate operated by ground contact.

15. A silage grab attachment according to claim 13, in which the ejector means comprises a hydraulically operated ejector gate.

16. A silage grab implement according to claim 1, in which the movable part is pivotally connected to the fixed part about a generally horizontally extending rotational axis.

17. A silage grab implement according to claim 1, in which the movable part comprises a front wall member with a cutting edge along the lower front edge thereof.

18. A silage grab implement according to claim 17, which is provided with drive means arranged to drive the cutting edge of the movable part in an arc towards the cutting edge on the floor member of the fixed part.

19. A silage grab implement according to claim 1, wherein the moveable part has a front wall member provided with a cutting knife edge along a lower front edge thereof facing said leading edge, wherein the moveable part has an open position and a closed position with respect to said rear wall member, and said front wall member lies substantially in an arc of pivoting of said moveable part with respect to said fixed part.

20. A silage grab implement, the grab implement comprising a fixed part and a movable part pivotally coupled thereto to form a grab, the fixed part having a continuous rear wall member and a continuous floor member projecting forwardly therefrom, the floor member having a cutting knife edge along a leading edge thereof, wherein the fixed part comprises a plurality of gusset members extending between the rear wall member and the floor member, the gusset members forming continuous side members for the fixed part, and wherein the side members and any other gusset members are provided with cutting edges on their upper edges.

21. A silage grab implement according to claim 20, in which the fixed part is provided with ejector means for ejecting solid material from the grab attachment.

22. A grab attachment according to claim 21 in which the ejector means comprises an ejector gate operated by ground contact.

23. A silage grab implement, the grab implement comprising a fixed part and a movable part pivotally coupled thereto to form a grab, the fixed part having a continuous rear wall member and a continuous floor member projecting forwardly therefrom, the floor member having a cutting knife edge along a leading edge thereof, wherein the fixed part is provided with ejector means for ejecting solid material from the grab attachment, said ejector means comprising an ejector gate operated by ground contact.

24. A silage grab implement according to claim 23, in which the fixed part comprises a generally bucket shaped member.

25. A silage grab implement according to claim 23, in which the cutting knife edge on the floor member is substantially straight.

26. A silage grab implement according to claim 23, in which the cutting knife edge on the floor member is V-shaped.

27. A silage grab implement according to claim 23, in which the cutting knife edge on the floor member is serrated.

28. A silage grab implement according to claim 23, in which supporting means is provided beneath the floor to raise the cutting knife edge slightly above the ground.

29. A silage grab implement according to claim 28, in which the supporting means comprises a wear strip arranged around the side edges and rear edge of the underside of the floor member.

30. A silage grab implement according to claim 28, in which the supporting means has a height of from substantially 10 mms to substantially 40 mms.

31. A silage grab implement according to claim 23, in which the cutting knife edge along the leading edge of the floor member is provided with edge protectors which extend forwardly of the cutting knife edge.

32. A silage grab implement according to claim 31, in which the edge protectors are provided at each end of the cutting knife edge.

33. A silage grab implement according to claim 23, in which the moveable part is pivotally connected to the fixed part about a generally horizontally extending rotational axis.

34. A silage grab implement according to claim 23, in which the moveable part comprises a front wall member with a cutting edge along the lower front edge thereof.

35. A silage grab implement according to claim 34, which is provided with drive means arranged to drive the cutting edge of the moveable part in an arc towards the cutting edge on the floor member of the fixed part.

36. A silage grab implement according to claim 23, in which the gusset members form continuous side members for the fixed part.

37. A silage grab implement according to claim 36, in which the side members and any other gusset members are provided with cutting edges on their upper edges.

* * * * *